(12) United States Patent
Khan

(10) Patent No.: US 10,182,320 B2
(45) Date of Patent: Jan. 15, 2019

(54) METHOD OF TRANSMITTING INFORMATION REGARDING AN EMERGENCY BETWEEN A MOBILE TERMINAL AND AN EMERGENCY MANAGEMENT SITE

(71) Applicant: VOLKSWAGEN AG, Wolfsburg (DE)

(72) Inventor: Muhammad Farooq Khan, Moers (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/480,408

(22) Filed: Apr. 6, 2017

(65) Prior Publication Data
US 2017/0295482 A1   Oct. 12, 2017

(30) Foreign Application Priority Data
Apr. 7, 2016 (DE) .................. 10 2016 205 835

(51) Int. Cl.
| | |
|---|---|
| *H04W 4/90* | (2018.01) |
| *H04W 4/14* | (2009.01) |
| *H04W 76/50* | (2018.01) |
| *H04W 4/12* | (2009.01) |
| *H04W 4/20* | (2018.01) |

(52) U.S. Cl.
CPC ............. *H04W 4/14* (2013.01); *H04W 4/90* (2018.02); *H04W 76/50* (2018.02); *H04W 4/12* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 5,937,355 A | 8/1999 | Joong et al. | |
| 9,049,584 B2 * | 6/2015 | Hatton | .............. H04W 4/90 |

(Continued)

FOREIGN PATENT DOCUMENTS

| | | |
|---|---|---|
| DE | 102008038492 A1 | 2/2009 |
| DE | 102008015840 A1 | 6/2009 |

(Continued)

OTHER PUBLICATIONS

Telefon AB LM Ericsson, ST-Ericsson SA, eCall: Inband? eSMS!, Attachment to Tdoc S4-100940, 3GPP/SA4, Barcelona, Nov. 11, 2010.*

(Continued)

*Primary Examiner* — German Viana Di Prisco
(74) *Attorney, Agent, or Firm* — Barnes & Thornburg LLP

(57) ABSTRACT

Methods and devices for transmitting information regarding an emergency between a mobile terminal and an emergency control center. The method includes communicating first information regarding the emergency via a control channel of a mobile radio system between the mobile terminal and the emergency control center and communicating second information regarding the emergency via a speech channel of the mobile radio system between the mobile terminal and the emergency control center. The control channel may be a logical channel. The speech channel may also be a logical channel. Via the control channel, an SMS which may include the first information regarding the emergency, such as the emergency site and the time of the emergency, may be transmitted from the mobile terminal to the emergency control center.

20 Claims, 2 Drawing Sheets

(56) References Cited

U.S. PATENT DOCUMENTS

| | | | |
|---|---|---|---|
| 2007/0142026 A1* | 6/2007 | Kuz | B60R 25/102 |
| | | | 455/404.1 |
| 2009/0311988 A1 | 12/2009 | Johannesson et al. | |
| 2010/0202368 A1* | 8/2010 | Hans | H04M 3/5116 |
| | | | 370/329 |
| 2012/0225632 A1 | 9/2012 | Hellwig et al. | |
| 2012/0237002 A1 | 9/2012 | Sennett et al. | |
| 2013/0331056 A1* | 12/2013 | McKown | H04W 4/90 |
| | | | 455/404.1 |
| 2014/0295885 A1 | 10/2014 | Marko | |
| 2015/0264548 A1* | 9/2015 | Lee | H04W 4/22 |
| | | | 370/335 |

FOREIGN PATENT DOCUMENTS

| | | |
|---|---|---|
| DE | 102010053606 A1 | 6/2012 |
| DE | 102014201292 A1 | 7/2014 |
| EP | 1814093 A1 | 8/2007 |
| EP | 2668794 A1 | 12/2013 |
| KR | 20030037175 A | 5/2003 |
| RU | 2472309 C2 | 5/2012 |
| RU | 2504111 C2 | 3/2013 |

OTHER PUBLICATIONS

Office Action for German Patent Application No. 10 2016 205 835.5; dated Feb. 3, 2017.
Search Report for German Patent Application No. 10 2016 205 835.5; dated Feb. 3, 2017.
Search Report for European Patent Application No. 17162322.6; dated Aug. 8, 2017.
QUALCOMM: VoIP Emergency Call Support (S2-051950), 3rd Generation Partnership Project (3GPP) Draft, Aug. 31, 2005.
Office Action for Russian Patent Application No. 2017111571; dated May 23, 2018.

\* cited by examiner

METHOD OF TRANSMITTING INFORMATION REGARDING AN EMERGENCY BETWEEN A MOBILE TERMINAL AND AN EMERGENCY MANAGEMENT SITE

PRIORITY CLAIM

This patent application claims priority to German Patent Application No. 10 2016 205 835.5, filed 7 Apr. 2016, the disclosure of which is incorporated herein by reference in its entirety.

SUMMARY

Illustrative embodiments relate to methods for transmitting information regarding an emergency between a mobile terminal and an emergency control center.

BRIEF DESCRIPTION OF THE DRAWINGS

Configurations are described in greater detail below on the basis of the exemplary embodiments illustrated in the drawings, to which, however, exemplary embodiments generally are not restricted overall. In the figures.

DETAILED DESCRIPTION

Figure 1:
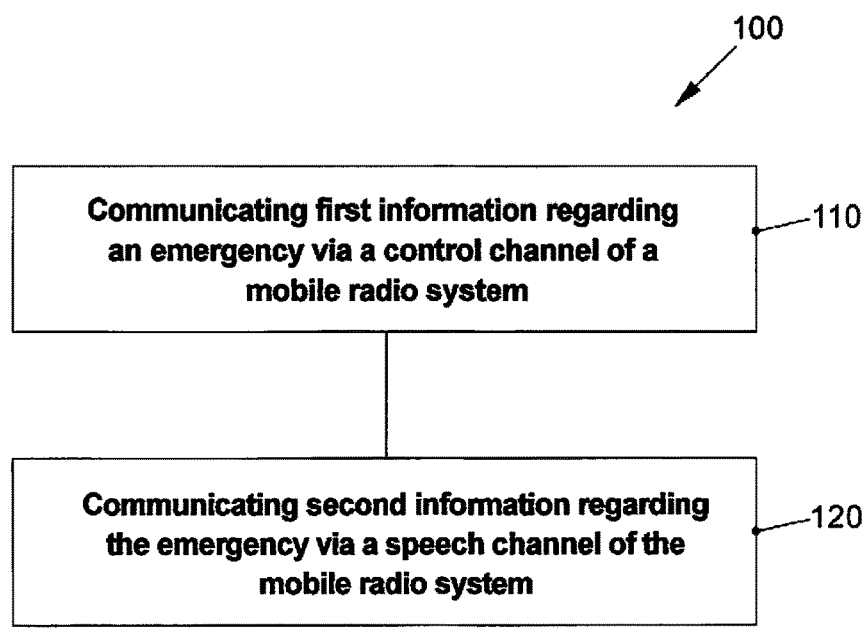
FIG. 1 shows a flow diagram of an exemplary embodiment of a method for transmitting information regarding an emergency between a mobile terminal and an emergency control center.

According to a decision by the European Commission, from 2018 on all new models of automobiles and light commercial vehicles shall be equipped on an obligatory basis with the emergency call system eCall (contraction of emergency call). In the event of accidents of motor vehicles and in emergencies, eCall is intended to enable precise and automatic alerting of rescue services. The intention is thus for helpers to reach the accident site more rapidly and to be supplied with more accurate information about the situation on site to be able to implement rescue measures appropriate to the circumstances of the emergency. The automatic alerting of the rescue services via the uniform European emergency call number 112 enables help to be called even if those affected are unconscious or no longer able to make an emergency call themselves. In addition, a manual emergency call, that is to say an emergency call made by a vehicle occupant, for example, via an emergency call button, is intended to be possible as well.

An emergency call according to the eCall standard shall be subdivided essentially into two phases. In a first phase, a so-called Minimum Set of Data (MSD) shall be transmitted from a motor vehicle in which the emergency call was triggered to a responsible emergency control center, referred to as Public Safety Answering Point (PSAP) in the eCall standard. The MSD shall contain information regarding the emergency, such as, for example, the emergency site, for example, described by the geographical coordinates thereof, the time of the emergency, a direction of travel of the motor vehicle, a Vehicle Identification Number (VIN) of the motor vehicle, a Service Provider Identification Number (SPIN), for example, of a mobile radio provider of a mobile radio connection used for the emergency call, and also an identifier as to whether the emergency call was triggered manually or automatically.

A second phase of an emergency call according to the eCall standard involves a speaking mode during which the vehicle occupants may communicate with an emergency dispatcher at the emergency control center bidirectionally, in a manner similar to that in the case of a telephone call.

According to the eCall standard, a system that the motor vehicle comprises for carrying out the emergency call is referred to as an In-Vehicle-System (IVS). In this case, the IVS comprises, for example, a receiver of a global positioning system (GPS receiver for short) and sensors, such as acceleration, impact or airbag sensors, for example, which may trigger an emergency call automatically. Airbag sensors may respond, for example, if an airbag of the motor vehicle opens. Furthermore, the IVS may comprise an emergency call button, to make an emergency call manually, and a communication interface, which may be configured to enable communication with the emergency control center via a mobile radio network, for example.

In conformity with the eCall standard, a data exchange during the emergency call, for instance, requesting of the MSD by the emergency control center and sending of the MSD by the IVS, shall take place via a speech channel of a mobile radio system since such speech channels may be available in all mobile radio systems, such as, for example, in the Global System for Mobile Communications (GSM), the Universal Mobile Telecommunication System (UMTS), the Long Term Evolution (LTE) system or in a 5th Generation (5G) mobile radio system. Thus, without modification of mobile radio systems or the cellular mobile radio infrastructure thereof and independently of the mobile radio system used for the emergency call, the data exchange may be carried out during the emergency call.

On the other hand, a speech channel is principally suitable for the transmission of speech signals. Signals for transmission in speech channels are often processed by a speech codec, that is to say according to a method for coding and decoding speech. A speech codec may reduce the volume of data occurring in the transmission of a speech signal and may thus increase an effective data rate of a speech transmission. Examples of speech codecs are the method of Code-Excited Linear Prediction (CELP), the method of Advanced Multi-Band Excitation (AMBE) and a multitude of methods from the International Telecommunication Union (ITU). In this case, speech codecs are tailored to properties of speech signals, for example, to a high correlation within the speech signal, in other words a similarity of samples of the speech signal at temporally adjacent sampling points, to pauses between the spoken words, or to the major spectral component of a speech signal between approximately 300 Hertz and 3400 Hertz. Speech codecs are often unsuitable for coding data signals, such as the MSD, for example, since data signals may differ significantly from speech signals, for example, in terms of the properties mentioned above. Consequently, when speech codecs are applied to data signals, they may often lead to nonlinear distortions and to an incomplete transmission of the data signals. The data signal may then often no longer be reconstructed, that is to say no longer be readable, at the receiver. This may be detrimental in an emergency during the transmission of the MSD. By way of example, a frequent repetition of the transmission may become necessary.

Therefore, there is a need to improve the available methods for transmitting information regarding an emergency between a mobile terminal and an emergency control center.

This need is taken into account by the methods and devices according to the independent claims. It should be pointed out here that even if the methods and devices disclosed here are presented by way of example in the context of emergency calls of motor vehicles, they are not restricted to the transmission of information regarding an emergency in or at a motor vehicle, but rather can be applied to other contexts. By way of example, the methods and devices presented here can also be applied to an emergency call of a pedestrian, of a cyclist, of a ship or from a building.

An improvement in the available methods for transmitting information regarding an emergency between a mobile terminal and an emergency control center may be achieved by exemplary embodiments as follows.

Via a control channel of a mobile radio system, first information regarding the emergency is communicated between the mobile terminal and the emergency control center. Moreover, via a speech channel of the mobile radio system, second information is communicated between the mobile terminal and the emergency control center. The mobile terminal may be, for example, an IVS of a motor vehicle, a cellular phone, a telephone according to the DECT standard (abbreviation stands for Digital Enhanced Cordless Telecommunications), a public emergency call telephone or a domestic emergency call telephone. The emergency control center may be, for example, a control center for receiving emergency calls via the European emergency call 112 or the North American emergency call 911, such as a rescue control center or an operations center of the fire service, the police or for disaster management. Furthermore, the emergency control center may also be a control center of an automobile association, such as, for example, the control center of the air rescue service of the General German Automobile Association (Allgemeiner Deutscher Automobil-Club (ADAC)), or a control center of a Telematics Service Provider (TSP). TSPs are, for example, companies that offer telecommunications and information services for motor vehicles. By way of example, they provide motor vehicles with traffic information or may carry out remote diagnoses in the event of technical disturbances on a motor vehicle. Moreover, TSPs may have, for example, their own emergency control centers and/or telephone and switching centers to receive emergency calls or to relay emergency calls to public emergency control centers (to a PSAP in the case of eCall). Furthermore, emergency calls may also be switched from a public emergency control center or from a PSAP to a TSP. Emergency control centers of TSPs are also known as Private Emergency Call Centers (Private ECC).

In some exemplary embodiments, the control channel and the speech channel may comprise different logical channels of the mobile radio system. Logical channels may in turn differ from one another in the type of information that is transmitted via them. In this regard, by way of example, a first type of logical channels may be configured to transmit signaling and control information of the mobile radio system. A second type of logical channels may be configured, for example, to transmit useful data, such as, for example, speech, texts, characters, images and/or sounds. The second type of logical channels is also referred to as traffic channels.

In some exemplary embodiments, by way of example, the control channel may comprise a logical channel of the first type, that is to say a logical channel for transmitting signaling and control information, while the speech channel may comprise a logical channel of the second type, that is to say a logical channel for transmitting useful data.

Logical channels of the first type, that is to say logical channels for transmitting signaling and control information, may differ from one another as to whether they are used jointly by a plurality of terminals, for example, in a mobile radio network, so-called common channels, or whether they are assigned to a specific mobile terminal or a specific connection from a mobile terminal to a network element, such as a base station, so-called dedicated channels. Common channels may transmit, for example, general signaling and control information of the mobile radio network, for example, information for identifying the mobile radio network, for identifying a mobile radio cell, or for identifying mobile radio resources, such as, for example, frequency channels or time slots. By contrast, dedicated channels may serve for controlling and signaling a specific telecommunication connection within the mobile radio network; they may serve for setting up, maintaining and ending a telecommunication connection.

In some possible implementations, the control channel may comprise a dedicated channel. Additionally or alternatively, in some exemplary embodiments, the control channel may comprise a common channel.

In some exemplary embodiments, different logical channels or the control channel and the speech channel may access different telecommunications resources, such as different frequency channels, for example, in a Frequency Division Multiple Access (FDMA) method, different recurring time slots, for example, in a Time Division Multiple Access (TDMA) method, and/or different spreading codes, for example, in a Code Division Multiple Access (CDMA) method, or they may use some telecommunications resources jointly and take up others only by themselves.

By way of example, in some exemplary embodiments, the control channel and the speech channel may use the same frequency channel but a different time slot for the transmission. By way of example, the control channel may use a first frequency channel and a first recurring time slot and the speech channel may use the first frequency channel and a second recurring time slot for the transmission of information.

In at least some forms of implementation, the control channel and the speech channel may use the same telecommunications resources. By way of example, the control channel and the speech channel may use an identical frequency channel and an identical recurring time slot for the transmission of information. In this case, by way of example, the control channel and the speech channel may alternately use the recurring time slot.

Furthermore, in some exemplary embodiments, the control channel and the speech channel may simultaneously use a recurring time slot for the transmission; in other words, they may share the time slot. By way of example, the information to be transmitted via the control channel and the information to be transmitted via the speech channel may be transmitted as a telecommunications frame, wherein within the frame a first part of the frame, for example, a first subframe, may communicate the information to be transmitted via the control channel and a second part of the frame, for example, a second subframe, may communicate the information to be transmitted via the speech channel.

Furthermore, in some exemplary embodiments, the control channel and the speech channel may use an identical frequency channel, an identical recurring time slot, but a different spreading code for the transmission of information.

Besides the transmission of signaling and control information, a control channel may be configured to transmit useful data, for example, texts and/or characters. For this purpose, by way of example, a portion of the telecommunications resources used by a traffic channel may be allocated to the control channel, such that the latter itself may transmit useful data. If the traffic channel is optimized, for example, for a transmission of speech, for example, by applying a speech codec to the useful data to be transmitted by the traffic channel, a transmission of different useful data, such as texts or characters, for example, may be effected more reliably and more efficiently via the control channel.

If the mobile radio system is the Global System for Mobile Communications, GSM, for example, it is possible to use, for example, an SDCCH channel (stands for Stand-Alone Dedicated Control Channel), an SACCH channel (stands for Slow Associated Control Channel) and/or an FACCH channel (stands for Fast Associated Control Channel) as control channel for communicating the first information, for example, an SMS.

The speech channel for communicating the second information may be, for example, a traffic channel for speech, such as in GSM, for example, a TCH/FS channel (stands for Traffic Channel at full rate Speech) and/or a TCH/HS channel (stands for Traffic Channel at half rate Speech).

In some exemplary embodiments, the first information transmitted via the control channel may comprise essential information regarding the emergency, such as, for example, the emergency site, the time of the emergency and an identification of the mobile terminal from which the emergency call proceeds, such as the call number of the mobile terminal, for example, and, if a motor vehicle comprises the mobile terminal, a VIN of the motor vehicle.

In some exemplary embodiments, the second information transmitted via the speech channel may comprise a conversation between an emergency dispatcher at an emergency control center and a person at the emergency site. Alternatively or additionally, the second information may comprise a request signal which may be communicated from the emergency control center to the mobile terminal and which may be configured to cause the mobile terminal to communicate the first information once again, for example, via the speech channel, to the emergency control center. This may be detrimental, for example, if the first information was unable to be communicated via the control channel, or unable to be communicated via the latter without errors. Communicating the request signal via the speech channel may comprise an in-band communication, for example.

In an in-band communication, the speech channel may be used for transmitting data and control signals, such as the request signal, which need not be present as speech. During this transmission of data and control signals via the speech channel, by way of example, loudspeakers and microphones on the part of the mobile terminal and on the part of the emergency control center may be deactivated, such that the transmission of the data and of the control signals may not be audible via the loudspeakers, that is to say may be mute, and may not be disturbed by acoustic signals recorded, under certain circumstances, by the microphones. Furthermore, data and control signals, such as the request signal, for example, that are to be transmitted via the speech channel in the in-band communication may be subjected to an additional digital signal processing which takes account of the fact that the signal to be transmitted is processed by a speech codec of the speech channel. This additional digital signal processing may, for example, modulate the data and control signals to be transmitted via the speech channel such that they may appear similar to speech signals in their properties, such as, for example, in their frequency bandwidth, their autocorrelation function and their power density spectrum.

When transmitting first information via the control channel of the mobile radio system and second information via the speech channel of the mobile radio system, the control channel may be configured to transmit data that may be present as texts or characters, for example, while the speech channel may be configured to transmit a conversation between an emergency dispatcher and a person at the emergency site, for example, a vehicle occupant in the case of a motor vehicle emergency. In this way, both the exchange of data that may contain information regarding the emergency and the practicability of a conversation between the emergency dispatcher and the person at the emergency site may thus be ensured more reliably.

Possible exemplary embodiments furthermore provide a method in which communicating the first information via the control channel may take place temporally before communicating the second information via the speech channel. By virtue of important information regarding the emergency already being available to the emergency dispatcher at the time of a conversation with the person at the emergency site, for example, text, characters or graphical representations, the holding of the conversation may be simplified and shortened and second information may be exchanged in a more targeted manner during the conversation. In this case, the first information may be transmitted to the emergency control center, for example, in a national or official language associated with the emergency site, such that, even if the person at the emergency site does not have a good command of the national or official language and communication in a conversation with the emergency dispatcher may thus be difficult, helpful information for the coordination of rescue measures may nevertheless be available to the emergency dispatcher.

Moreover, in some embodiments, communicating the first information between the mobile terminal and the emergency control center may be carried out before the speech channel is set up between the mobile terminal and the emergency control center. The first information may be communicated independently of the set-up of the speech channel and thus more rapidly. By way of example, there is no need to wait for the successful set-up of the speech channel, which may occupy a few seconds, for example, approximately two to five seconds, provided that the set-up of the speech channel proceeds successfully. If the set-up of the speech channel fails, it may be necessary to repeat the set-up process a number of times, under certain circumstances. This may occupy a significantly longer time, for example, 10 seconds to 60 seconds.

In some forms of implementation of the present method, the first information may be stored in a data management system located remotely both with respect to the mobile terminal and with respect to the emergency control center before the speech channel is set up. Once the speech channel has been set up, the emergency control center or an emergency dispatcher may then retrieve the first information from the data management system. The first information may be present at all emergency control centers which are appropriate for attending to and handling the emergency. By way of example, when communicating the first information to the European emergency call number 112, an IVS may not know an exact emergency control center, under certain circumstances. The IVS, for example, sends the first information to the European emergency call number 112 and sets up the speech channel to the European emergency call number 112. It may then be doubtful whether the first information is also communicated to the emergency control center to which the speech channel is also set up. To ensure that the first information is also available to the emergency control center to which the speech channel is set up, the first information may be stored in the data management system. Consequently, after the speech channel has been set up to the emergency control center, the latter may retrieve the first information from the data management system. Furthermore, it should be noted here that the emergency control center may read and/or evaluate the first information before the second information is communicated, for example, a conversation, via the speech channel.

In some possible implementations of the present method, the first information may be transmitted by means of a Short Message Service (SMS). The short message service SMS is implemented in many mobile radio standards, such as GSM, UMTS and LTE, and is thus available virtually with blanket coverage. This may bring about more reliable communication of the first information. Hereinafter, the abbreviation SMS shall denote a short message of the short message service itself, as is customary in linguistic usage nowadays, unless expressly worded otherwise.

Furthermore, in some exemplary embodiments, the first information may comprise at least one of the following items of information: the geographical coordinates of the emergency site, the number of emergency victims, the time of the emergency, the SPIN of a mobile radio provider via whose mobile radio network the emergency call is made, and an identifier as to whether an emergency call assigned to the first information was triggered automatically or manually. In the case of an emergency in or at a motor vehicle, the first information may comprise information regarding a direction of travel of the motor vehicle and a VIN of the motor vehicle.

Important information for coordinating rescue and emergency measures may thus be available to the emergency control center. Consequently, the exact location of the accident may be known to the emergency control center, as well as the direction of travel of a motor vehicle from which the emergency call was triggered. Primarily in the case of a rescue on a highway, this may have the consequence that the persons affected by the emergency are saved more rapidly and the emergency site is safeguarded more rapidly. With knowledge of the number of emergency victims, for example, enough rescue personnel and rescue material, in particular a sufficient number of rescue vehicles, may be sent to the emergency site. Via the VIN, the emergency control center may recognize what model of motor vehicle is affected by the emergency, such that emergency measures may be implemented for this model of motor vehicle. Information may thus be available to the rescue services with regard to how, for example, a specific model of motor vehicle may be opened the most easily and safely during a rescue. Thus, for example, the rescue time may be shortened and the rescue may become safer. What may be beneficial about an identifier as to whether the emergency call was triggered automatically or manually is that it may permit, for example, important conclusions to be drawn about the type of emergency. An automatically triggered emergency call may be indicative of an accident, for example, since the automatic triggering may be effected, for example, by sensors, such as impact, acceleration or airbag sensors. By contrast, a manually triggered emergency call may be indicative, for example, of a vehicle occupant suddenly being taken ill.

In addition, in some exemplary embodiments, communicating the second information may comprise coding and decoding the second information according to a speech codec. This may lead to better comprehensibility provided that the second information is present as speech. Furthermore, a speech channel of a mobile radio system may be implemented via a speech codec. The second information may be exchanged via the speech channel between the mobile terminal and the emergency control center and be coded and decoded by means of the speech codec. In this case, the second information may also be present as data or control signals and nevertheless be processed by the speech codec, that is to say be transmitted via the speech channel. Such speech channels are implemented in most mobile radio systems, such that the second information may be transmitted independently of the exact mobile radio system that may be available at the emergency site. Moreover, the current version of the eCall standard prescribes use of a speech channel both for the transmission of speech and for the transmission of control signals and of data, in particular of the MSD. For a method conforming with the eCall standard and thus for at least some exemplary embodiments of the present method to exhibit usability that is possible at many places, it may therefore be beneficial if communicating the second information comprises coding and decoding the second information according to a speech codec.

In some disclosed embodiments, the first information may be communicated from the mobile terminal to the emergency control center. In addition, on the part of the emergency control center it is possible to check whether the first information was communicated without errors. Additionally, in the case of an error-free communication of the first information, the second information may furthermore be communicated as speech; while in the case of a communication of the first information with errors, the second information may comprise a request signal. The request signal may be communicated from the emergency control center to the mobile terminal. It may be configured to cause the mobile terminal to communicate the first information once again via the speech channel. Here and hereinafter, errors in the communication of information are understood to mean data errors, such as bit errors, for example, which result from connection problems between two communication partners, here the mobile terminal and the emergency control center, such as, for example, as a result of distortions of the transmission channel or as a result of noise influences. Such errors may be ascertained, for example, by the use of error detecting codes and the evaluation at the receiver end of check values assigned to the transmitted codes. One possible method for error detection is the Cyclic Redundancy Check (CRC), for example. Furthermore, here and hereinafter, errors in the communication of information are understood to mean an unintentional omission—in other words an omission that does not correspond to a protocol underlying the transmission—of the communication of the information between sender and receiver, in particular an unintentional complete omission of reception of the information.

In the disclosed embodiments described above, the time for performing the emergency call, that is to say both the duration for the data communication and the duration until a connection for a conversation between an emergency dispatcher at an emergency control center and a person at the emergency site has been established, may be shortened. This is because if the first information, for example, an MSD in the case of eCall, which may be transmitted via the control channel of the mobile radio system, is available to the emergency dispatcher without errors, then transmission of the first information via the speech channel, for example, via the speech channel of an eCall connection, may be obviated and a conversation between the emergency dispatcher and the person at the emergency site may take place immediately. The second information may thus be information from this conversation. If the communication of the first information exhibits errors and has thus failed, then, in a manner conforming with the eCall standard, the emergency control center may request the first information from the mobile terminal via the speech channel. The second information exchanged between the emergency control center and the mobile terminal may thus comprise a request signal as an alternative to the second information from the conversation described above and signal to the mobile terminal to communicate the first information once again via the speech channel.

In some implementation examples, the mobile radio system used both for communicating the first information and for communicating the second information between the mobile terminal and the emergency control center may comprise the Global System for Mobile Communications, GSM. GSM constitutes an established mobile radio system which is in widespread use and which is available virtually with blanket coverage in Europe, for example, such that emergency calls on the basis of GSM may thus be carried out at many places.

Disclosed embodiments additionally provide a device for communicating information regarding an emergency between a mobile terminal and an emergency control center. The device comprises a unit, for example, a mobile radio interface, for communicating, via a control channel of a mobile radio system, first information regarding the emergency between the mobile terminal and the emergency control center. Furthermore, the device comprises a unit for communicating, via a speech channel of the mobile radio system, second information regarding the emergency between the mobile terminal and the emergency control center. The unit for communicating the second information may be the same unit as for communicating the first information, that is to say, for example, the mobile radio interface mentioned above. The latter may be configured, for example, to transmit both the first information via a control channel and the second information via a speech channel of the mobile radio system.

A motor vehicle may comprise the device described. Alternatively or additionally, an emergency control center may comprise such a device.

Furthermore, the device described may comprise a system which may implement a method for transmitting information regarding an emergency between a mobile terminal and an emergency control center according to the exemplary embodiments described above.

Various exemplary embodiments will now be described more thoroughly with reference to the accompanying drawings, which illustrate some exemplary embodiments.

Although exemplary embodiments may be modified and amended in various ways, exemplary embodiments are illustrated as examples in the figures and are described thoroughly herein. It should be clarified, however, that there is no intention to restrict exemplary embodiments to the forms respectively disclosed, rather that exemplary embodiments are intended to cover all functional and/or structural modifications, equivalents and alternatives that lie within the scope of the disclosed embodiments.

It should be noted that one element designated as "connected" or "coupled" to another element may be directly connected or coupled to the other element, or intervening elements may be present. By contrast, if one element is designated as "directly connected" or "directly coupled" to another element, no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves merely to describe specific exemplary embodiments and is not intended to restrict the exemplary embodiments. As used herein, the singular forms "a", "an" and "the" are also intended to include the plural forms, as long as the context does not unambiguously indicate something else. Furthermore, it should be clarified that the expressions such as e.g., "includes", "including", "has", "comprises", "comprising" and/or "having", as used herein, indicate the presence of stated features, integers, operations, work sequences, elements and/or components, but do not exclude the presence or the addition of one or one or more features, integers, operations, work sequences, elements, components and/or groups thereof.

As an introduction, FIG. 1 shows an exemplary embodiment of a method 100 for transmitting information regarding an emergency between a mobile terminal and an emergency control center. The method 100 comprises communicating 110 first information regarding the emergency via a control channel of a mobile radio system between the mobile terminal and the emergency control center. In addition, the method 100 comprises communicating 120 second information regarding the emergency via a speech channel of the mobile radio system between the mobile terminal and the emergency control center. The control channel may be, for example, a logical channel that may also serve for transmitting signaling and control information. Examples are GSM SDCHH, SACCH or FACCH channels. The speech channel may also be a logical channel, such as, for example, a GSM TCH/FS or TCH/HS channel.

Via the control channel, for example, an SMS which may comprise the first information regarding the emergency, such as the emergency site and the time of the emergency, for example, may be transmitted from the mobile terminal to the emergency control center. On the one hand, the possibility may then exist that the first information may be received by the emergency control center without errors, such that the second information regarding the emergency may be exchanged between the emergency control center and the mobile terminal, for example, a conversation between a person at the emergency site who is using the mobile terminal and an emergency dispatcher at the emergency control center.

On the other hand, it may happen that the first information is received by the emergency control center with errors and therefore may not yet be available to the emergency control center. The second information may then comprise a request signal, for example, which may be sent from the emergency control center to the mobile terminal via the speech channel to cause the mobile terminal to communicate the first information once again to the emergency control center. For communicating the first information once again, the mobile terminal may use, for example, the speech channel of the mobile radio system. Additionally or alternatively, the mobile terminal may also use the control channel to communicate the first information once again to the emergency control center.

Figure 2:
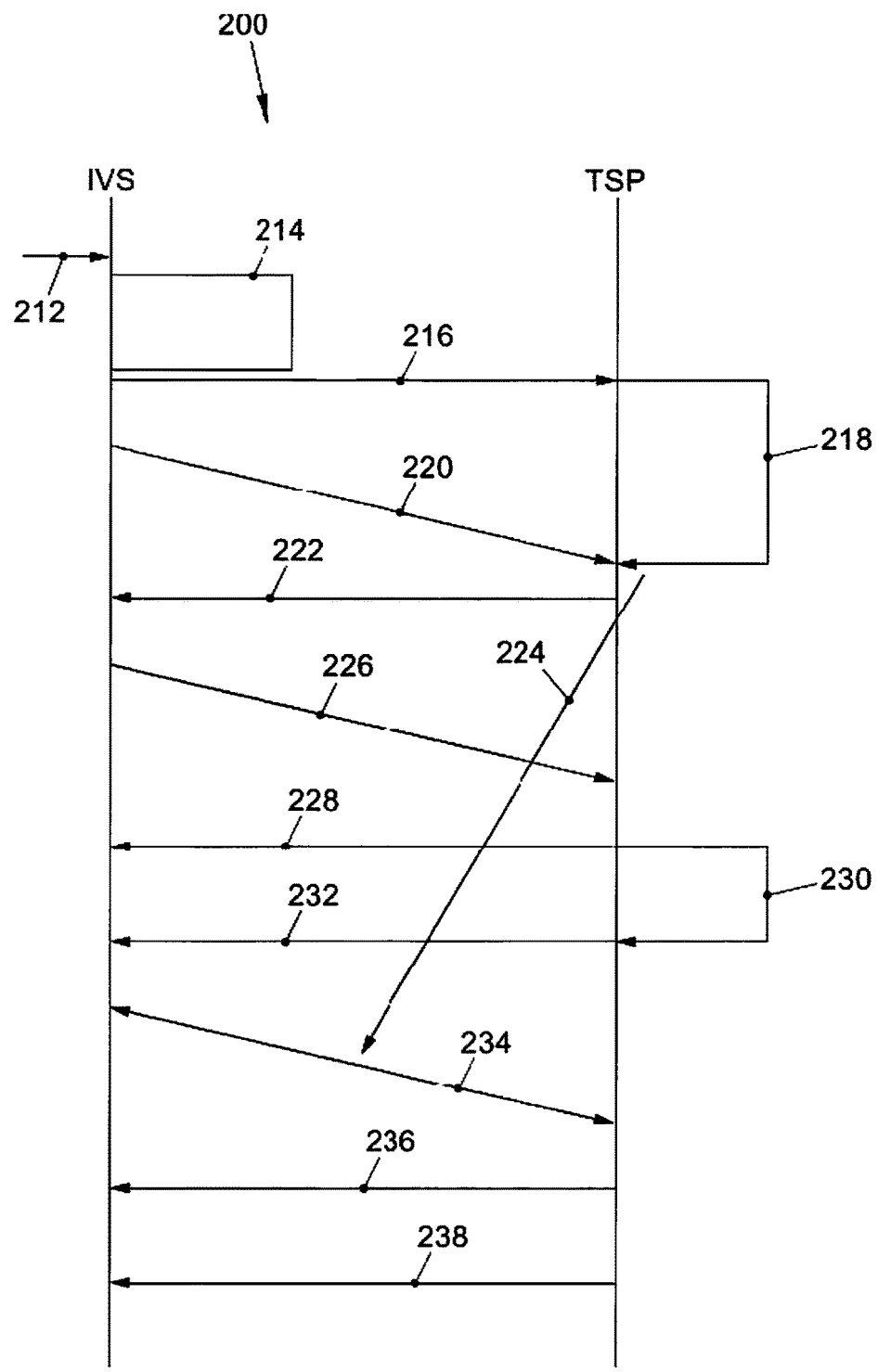
FIG. 2 shows a flow diagram of an exemplary embodiment of a further method for transmitting information regarding an emergency between an in-vehicle system and a telematics service provider.

FIG. 2 shows a flow diagram of one possible method 200 for transmitting information regarding an emergency between an IVS and a telematics service provider (TSP). The vertical direction in the flow diagram in FIG. 2 should be understood as a time axis on which events and processes that take place sooner in time are arranged further up the earlier they occur.

In this case, a Car Connectivity Unit (CCU) may comprise the IVS and may be configured to set up a connection to the TSP via a mobile radio network, for example, and may comprise a network access authorization, for example, a SIM card (abbreviation stands for Subscriber Identity Module). An Electronic Control Unit (ECU) of a motor vehicle may in turn comprise and control the CCU. An ECU may be, for example, an embedded system of the motor vehicle which may serve for the central, electronic control of various subsystems of the motor vehicle, such as, for example, of the engine and brakes of the motor vehicle.

At least one possible exemplary embodiment of the present method 200 begins in an emergency of the motor vehicle with a triggering of an emergency call by an emergency trigger signal. The latter may be generated 212 automatically, for example, by the response of impact, acceleration and/or airbag sensors. Such a signal is also referred to as an ACN trigger (abbreviation stands for Automatic Crash Notification). Alternatively or additionally, the emergency trigger signal 212 may be generated manually, for example, via an actuation of an emergency button, and is then also referred to as an MEC trigger (abbreviation stands for Manual Emergency Call). As a reaction to the emergency trigger signal 212, the IVS may immediately send 214 an SMS to the TSP, for example, via a mobile radio system.

In this case, the SMS may be sent via a control channel of the mobile radio system, for example, via a GSM SDCCH, SACCH or FACCH channel. To communicate the SMS to the TSP, the SMS may firstly be transmitted from the IVS to a Short Message Service Center (SMSC). The SMSC may be connected to a PSAP, for example, by a transmission method on the basis of the Internet protocol (IP), such as, for example, the Short Message Peer to Peer Protocol (SMPP protocol), and forward the SMS to the PSAP. At the PSAP, the SMS or the data contained in it may be filtered and communicated to the TSP, for example, according to an SMPP protocol. During the transmission of the SMS from the SMSC to the PSAP and during the transmission of the SMS from the PSAP to the TSP, it is possible to use, for example, SMPP bind commands from the SMPP protocol for producing connections.

In addition, the SMS may comprise an MSD regarding the emergency. Optionally, the SMS may additionally comprise an Extended Set of Data (ESD), which may contain, for example, information on the severity of the emergency, for example, whether the motor vehicle has turned over, at what speed the emergency call was triggered, whether a fire is developing in or on the vehicle, and whether the safety belts were fastened, etc.

The TSP may receive the SMS, decode or extract from it the MSD and possibly the ESD and provide the MSD and possibly the ESD with a ticket identity number. The ticket identity number may be generated, for example, from a time stamp of the received SMS and optionally in addition from the VIN of the motor vehicle communicated in the MSD, such that the communicated MSD and possibly the additionally communicated ESD may be unambiguously assigned to the motor vehicle and a specific emergency of this motor vehicle.

After sending the SMS 214, the IVS may immediately begin to set up 216 an emergency call connection to the TSP, for example, via the mobile radio system used for sending the SMS. After arrival of the emergency call connection, wherein, for example, inter alia, the VIN of the emergency-calling motor vehicle may be communicated from the IVS to the TSP, the TSP may check 218, for example, on the basis of the VIN, whether it has received a valid and error-free SMS with an MSD and possibly with an ESD from the motor vehicle within a preceding, predefined time period, for example, five minutes, fifteen minutes or twenty-five minutes.

During the checking 218 of the reception of a valid and error-free SMS by the TSP, the IVS may send to the TSP, for example, an initiation signal conforming with the eCall standard. Such an initiation signal may be sent, for example, over a time duration of two seconds, three seconds or five seconds and serve for synchronizing a data connection between the IVS and the TSP via a speech channel of the mobile radio system. The speech channel may be, for example, a logical channel, such as a GSM TCH/FS or TCH/HS channel. Furthermore, the IVS and the TSP may have so-called in-band modems, for example. These are devices which may be configured to condition data and control signals such that they may be transmitted via a speech channel of a mobile radio system. In other words, in-band modems both on the part of the IVS and on the part of the TSP may modulate and respectively demodulate data and control signals for sending and receiving via the speech channel.

After communication of the initiation signal 220 to the TSP and after conclusion of the synchronization of the data connection between the IVS and the TSP, two different conditions may be present at the TSP on the basis of the checking 218 of the reception of a valid and error-free SMS by the TSP:

The SMS was able to be received at the TSP without errors. The MSD which the SMS comprises and possibly the ESD which the SMS comprises are readable by the TSP, such that the information contained in them may be available to the TSP. Transmission of this information via the speech channel of the mobile radio system may therefore be obviated. In other words, the TSP need not once again retrieve the information from the MSD and possibly from the ESD via a request signal 222 from the IVS. Instead, the TSP may remain inactive for a time period predefined in accordance with the eCall standard, for example, two seconds, three seconds or five seconds, and may then switch 224 into a conversation mode, that is to say into a transmission mode for speech via the speech channel of the mobile radio system. As a result of refraining from sending the request signal 222 to the IVS, a time-out condition for receiving the request signal may additionally occur at the IVS, for example, after the time period during which the TSP is inactive has elapsed. Consequently, since reception of the request signal at the IVS fails to occur, the IVS may also switch to the conversation mode immediately after the occurrence of the time-out condition. A conversation 234 between the IVS and the TSP may then take place. In the conversation 234 it is possible to exchange, for example, further, second information regarding the emergency, for example, between a person at the IVS or at the emergency site and an emergency dispatcher at the TSP or a public emergency control center.

On the other hand, it is possible that the SMS may not be received without errors at the TSP, such that the MSD that the SMS comprises, and if appropriate the ESD, may not be readable by the TSP. The information regarding the emergency from the MSD and possibly from the ESD may therefore not yet be available at the TSP. Consequently, the TSP may communicate 222 a request signal to the IVS via the speech channel of the mobile radio system. By means of the request signal, the TSP may request the IVS to communicate once again the MSD and possibly the ESD via the speech channel. If the IVS may receive the request signal without errors before the time-out condition with respect to the reception thereof occurs, then the IVS may once again communicate 226 the MSD and possibly the ESD to the TSP via the speech channel.

If no initiation signal may be received by the TSP or if the initiation signal may be received by the TSP only with errors, then a time-out condition with respect to the reception of the initiation signal may occur at the TSP. After the occurrence of the condition, if no error-free initiation signal may be received at the TSP, for example, after two seconds, three seconds or five seconds since the set-up of the emergency call connection 216, the TSP may switch to the conversation mode 234 and refrain from communicating the request signal to the IVS, such that the IVS may also switch to the conversation mode 234 after the occurrence of the time-out condition with respect to the reception of the request signal.

After error-free reception of the request signal, the IVS may send the MSD and possibly the ESD to the TSP repeatedly until the TSP acknowledges to the IVS the error-free reception thereof or until a time-out condition with respect to the reception of this acknowledgement at the IVS occurs. For the purpose of acknowledgement, the TSP may communicate 228 to the IVS, for example, an acknowledge signal via the speech channel. The acknowledge signal may be, for example, an acknowledge signal of a low-level transfer layer, for example, of a link layer. Such an acknowledge signal is therefore also referred to as link layer acknowledge signal. A transfer layer shall be understood here to be a layer from a reference model for network protocols, such as, for example, the Open Systems Interconnection Model (OSI model) or the Transmission Control Protocol Internet Protocol Model (TCP/IP model). The time-out condition with respect to the reception of the acknowledgement, for example, of the link layer acknowledge signal, on the part of the IVS may, for example, be twenty seconds, twenty-five seconds or thirty seconds. During this time the IVS may continuously and repeatedly send the MSD and possibly the ESD to the TSP via the speech channel of the mobile radio system.

If the time-out condition with respect to the reception of the acknowledgement or of the link layer acknowledge signal on the part of the IVS occurs, then the IVS may interpret this such that the MSD and possibly the ESD may not be communicated to the TSP without errors. The IVS may then switch to the conversation mode. If, on the part of the TSP, the MSD and possibly the ESD may not be received without errors before the occurrence of a time-out condition with respect to the reception of the MSD and possibly the ESD via the speech channel of the mobile radio system, for example, before twenty seconds, twenty-five seconds or thirty seconds have elapsed since the communication of the request signal 222, then the TSP may also switch to the conversation mode.

If the TSP has received the MSD and possibly the ESD without errors via the speech channel, then the TSP may check 230 the content of the MSD and possibly of the ESD to establish whether the information regarding the emergency that is required by the TSP is contained therein. After checking the content of the MSD and possibly of the ESD, the TSP may communicate an acknowledge signal, for example, an acknowledge signal of a higher-level transfer layer, for example, of an application layer, via the speech channel to the IVS. Such an acknowledge signal is also referred to as application layer acknowledge signal. It may comprise an identifier, for example, a bit, which may signal to the IVS whether or not the information regarding the emergency that is communicated to the TSP via the MSD and possibly via the ESD corresponds to the information required by the TSP. After sending the application layer acknowledge signal on the part of the TSP, the TSP may switch to the conversation mode 234.

The IVS may switch to the conversation mode 234 as soon as it has received the application layer acknowledge signal, for example. If the IVS may not receive an error-free application layer acknowledge signal from the TSP, then the IVS may also switch to the conversation mode 234 provided that a time-out condition with respect to the reception of the application layer acknowledge signal occurs. The time-out condition may be set, for example, such that a maximum of five seconds, eight seconds or ten seconds, for example, are permitted to elapse between the reception of the link layer acknowledge signal and of the application layer acknowledge signal on the part of the IVS.

After a conversation 234 has been held between the IVS and the TSP, the TSP may retrieve a further, updated MSD and possibly a further, updated ESD from the IVS via a request signal 236 communicated after the conversation mode 234 has been carried out, which request signal may be transmitted, for example, via the speech channel of the mobile radio system. By way of example, the motor vehicle may have moved in the meantime and thus have occupied a new geographical location. It may then be beneficial, for example, to communicate the new geographical location of the motor vehicle once again by means of an MSD and possibly additionally an ESD from the IVS to the TSP (not shown in FIG. 2), such that the TSP may obtain knowledge of this new location. The TSP may acknowledge error-free reception of this further, updated MSD and possibly of the further, updated ESD to the IVS by means of a further application layer acknowledge signal 238 communicated after the conversation mode 234 has been carried out. This further application layer acknowledge signal 238 communicated after the conversation mode 234 has been carried out may be transmitted, for example, via the speech channel of the mobile radio system.

To summarize, it should be emphasized again that the IVS may send 214 the MSD and possibly the ESD regarding the emergency firstly by SMS to the TSP via a control channel of the mobile radio system, before the emergency call connection between the IVS and the TSP is actually set up 216. The SMS may be a conventional SMS, for example, that is to say an SMS which may be transmitted according to the routine methods and protocols, such as the SMPP protocol, via an SMSC from the IVS to the TSP. If a valid and error-free MSD and possibly additionally a valid and error-free ESD are present at the TSP before the end of the synchronization of the data connection between the IVS and the TSP via a speech channel of the mobile radio system by means of the communication of the initiation signal 220, then the TSP may switch to the conversation mode 234. The IVS may likewise switch to the conversation mode after the occurrence of the time-out condition with respect to the reception of the request signal. The time-out condition may occur since, on account of the MSD and possibly the ESD, already available at the TSP, the request signal need not be sent from the TSP to the IVS and therefore fails to appear. Consequently, the—under certain circumstances time-consuming—requesting, transmission and acknowledgement of the reception of the MSD and possibly of the ESD via the speech channel of the mobile radio system may be obviated. Consequently, by way of example, a conversation between a person at the accident site and an emergency dispatcher at the TSP may take place earlier, the emergency call may be concluded more rapidly and rescue measures may thus be implemented sooner at the emergency site.

If the MSD and possibly the ESD may not be transmitted without errors beforehand by SMS to the TSP, then according to the present exemplary embodiment and in conformity with the eCall standard they may be transmitted via the speech channel of the mobile radio system, for example, using in-band modems on the part of the IVS and on the part of the TSP or by an in-band communication.

The transmission of the SMS from the IVS to the TSP or to an emergency control center, which transmission takes place before the set-up of the emergency call connection, may thus be understood as an addition of redundancy for the communication of the MSD and possibly the ESD. The MSD and possibly the ESD may be communicated by SMS to the TSP or to the emergency control center. If the TSP or the emergency control center may not receive the SMS without errors or if the TSP or the emergency control center is not configured for receiving the SMS, then in at least some exemplary embodiments of the present method the MSD and possibly the ESD may, in conformity with the eCall standard, additionally also be communicated by in-band communication to the TSP or to the emergency control center.

It should be emphasized again that in-band communication should be understood to mean exchange of data and control signals, such as, for example, the request signal, the MSD, the ESD, the link layer acknowledge signal and the application layer acknowledge signal, via the speech channel of the mobile radio system. During in-band communication, therefore, the speech channel may be used for transmitting data and signals which need not be present as speech signals. During this transmission of data and control signals via the speech channel, by way of example, loudspeakers and microphones on the part of the IVS and on the part of the TSP may be deactivated, such that the transmission of the data and of the control signals may not be audible via the loudspeakers, that is to say may be mute, and may not be disturbed by acoustic signals recorded, under certain circumstances, by the microphones. After communication of the MSD and possibly of the ESD, the speech channel may then be used for a conversation connection between the IVS and the TSP. In this case, by way of example, it is possible to activate the loudspeakers and microphones on the part of the IVS and on the part of the TSP. By way of example, the TSP may activate its loudspeakers and microphones after sending an application layer acknowledge signal and the IVS may activate its loudspeakers and microphones after receiving the application layer acknowledge signal.

In some exemplary embodiments, reception of the SMS at the TSP may additionally occur after the speech channel has been set up between the IVS and the TSP. The SMS may be received, for example, after the communication 222 of the request signal from the TSP to the IVS. In the case of error-free reception of the SMS, the MSD and possibly the ESD may be extracted from the SMS at the TSP. Afterward, the TSP may communicate a link layer acknowledge signal and optionally an application layer acknowledge signal to the IVS, such that the IVS need no longer communicate the MSD and possibly the ESD via the speech channel or may stop communication possibly already carried out. The IVS and the TSP may then switch to the conversation mode 234 earlier.

LIST OF REFERENCE SIGNS

100 Method for transmitting information regarding an emergency between a mobile terminal and an emergency control center

110 Communicating first information regarding an emergency via a control channel of a mobile radio system

120 Communicating second information regarding the emergency via a speech channel of the mobile radio system

200 Method for transmitting information regarding an emergency between an IVS and a TSP

212 Generating or receiving an emergency trigger signal by the IVS

214 Sending an SMS with an MSD and possibly with an ESD from an IVS to a TSP

216 Setting up an emergency call connection from an IVS to a TSP

218 Checking reception of a valid and error-free SMS

220 Communicating an initiation signal from an IVS to a TSP

222 Communicating a request signal from a TSP to an IVS for requesting an MSD and possibly an ESD

224 Switching into a conversation mode on the part of a TSP

226 Communicating an MSD and possibly an ESD via a speech channel from an IVS to a TSP

228 Communicating an acknowledgement or a link layer acknowledge signal from a TSP to an IVS

230 Checking the content of an MSD and possibly of an ESD on the part of a TSP

232 Communicating an application layer acknowledge signal from a TSP to an IVS

234 Conversation or conversation mode between an IVS and a TSP

236 Communicating a further request signal from a TSP to an IVS after carrying out a conversation mode

238 Communicating a further application layer acknowledge signal from a TSP to an IVS after carrying out a conversation mode

The invention claimed is:

1. A method for transmitting information regarding an emergency between a mobile terminal and an emergency control center, the method comprising:
    communicating, via a control channel of a mobile radio system, first information regarding the emergency between the mobile terminal and the emergency control center; and
    communicating, via a speech channel of the mobile radio system, second information regarding the emergency between the mobile terminal and the emergency control center, and
    checking whether the first information was received by the emergency control center without errors, and, in response to the first information being received with errors, sending a request signal as at least a portion of the second information, wherein the request signal is communicated from the emergency control center to the mobile terminal and is configured to cause the mobile terminal to communicate the first information again, as a data signal, via the speech channel.

2. The method of claim 1, wherein communicating the first information via the control channel takes place temporally before communicating the second information via the speech channel.

3. The method of claim 1, wherein the first information is communicated, via the control channel, between the mobile terminal and the emergency control center before the speech channel is set up.

4. The method of claim 1, wherein the first information is stored in a data management system located remotely both with respect to the mobile terminal and with respect to the emergency control center before the speech channel is set up, and wherein the emergency control center retrieves the first information from the data management system after the speech channel has been set up.

5. The method of claim 1, wherein the first information is transmitted by a short message service, SMS.

6. The method of claim 1, wherein the first information comprises at least one of the following items of information: geographical coordinates of the emergency site, number of emergency victims, time of the emergency, service provider identification number and an identifier as to whether an emergency call assigned to the first information was triggered automatically or manually.

7. The method of claim 1, wherein communicating the second information comprises coding and decoding the second information according to a speech codec.

8. The method of claim 1, wherein the first information is communicated from the mobile terminal to the emergency control center.

9. The method of claim 8, wherein in the case of an error-free communication of the first information, the second information is communicated as speech.

10. The method of claim 1, wherein the mobile radio system comprises the Global System for Mobile Communications, GSM.

11. A method for transmitting information regarding an emergency between a mobile terminal and an emergency control center, the method comprising:
    communicating, via a control channel of a mobile radio system, first information regarding the emergency between the mobile terminal and the emergency control center; and
    checking whether the first information was communicated without errors; and
    communicating, via a speech channel of the mobile radio system, second information regarding the emergency between the mobile terminal and the emergency control center,
    wherein, in response to the first information being communicated with errors, the second information is formed to comprise a request signal from the emergency control center configured to cause the mobile terminal to recommunicate the first information as a data signal via the speech channel.

12. The method of claim 11, wherein communicating the first information via the control channel takes place temporally before communicating the second information via the speech channel.

13. The method of claim 11, wherein the first information is communicated, via the control channel, between the mobile terminal and the emergency control center before the speech channel is set up.

14. The method of claim 11, wherein the first information is stored in a data management system located remotely both with respect to the mobile terminal and with respect to the emergency control center before the speech channel is set up, and wherein the emergency control center retrieves the first information from the data management system after the speech channel has been set up.

15. The method of claim 11, wherein the first information is transmitted by a short message service, SMS.

16. The method of claim 11, wherein the first information comprises at least one of the following items of information: geographical coordinates of the emergency site, number of emergency victims, time of the emergency, service provider identification number and an identifier as to whether an emergency call assigned to the first information was triggered automatically or manually.

17. The method of claim 11, wherein communicating the second information comprises coding and decoding the second information according to a speech codec.

18. A method for transmitting information regarding an emergency between a mobile terminal and an emergency control center, the method comprising:
    communicating, via a control channel of a mobile radio system, first information regarding the emergency between the mobile terminal and the emergency control center;
    determining whether the first information was communicated with errors;
    communicating, via a speech channel of the mobile radio system, second information regarding the emergency between the mobile terminal and the emergency control center; and
    sending a request signal responsive to determination that the first information was communicated with errors, wherein the request signal is formed as part of the second information and is configured to cause the mobile terminal to recommunicate the first information as a data signal via the speech channel,
    wherein the first information is stored in a data management system located remotely both with respect to the mobile terminal and with respect to the emergency control center before the speech channel is set up, and wherein the emergency control center retrieves the first information from the data management system after the speech channel has been set up.

19. The method of claim 18, wherein the first information is communicated, via the control channel, between the mobile terminal and the emergency control center before the speech channel is set up.

20. The method of claim 18, wherein the first information comprises at least one of the following items of information: geographical coordinates of the emergency site, number of emergency victims, time of the emergency, service provider identification number and an identifier as to whether an emergency call assigned to the first information was triggered automatically or manually.

* * * * *